United States Patent [19]

Poole et al.

[11] 3,743,491

[45] July 3, 1973

[54] METHOD OF STRENGTHENING GLASS AND INCREASING THE SCRATCH RESISTANCE OF THE SURFACE THEREOF

[75] Inventors: James P. Poole; Herbert C. Snyder; Mark A. Boschini, all of Brockway, Pa.

[73] Assignee: Brockway Glass Company, Brockway, Pa.

[22] Filed: July 12, 1971

[21] Appl. No.: 161,982

Related U.S. Application Data

[63] Continuation-in-part of Ser. No. 782,738, Dec. 10, 1968, abandoned.

[52] U.S. Cl. .......................... 65/30, 65/60, 117/124
[51] Int. Cl. ............................................. C03c 21/60
[58] Field of Search ................................ 65/30, 60; 117/124 D

[56] References Cited
UNITED STATES PATENTS

| | | | |
|---|---|---|---|
| 3,615,322 | 10/1971 | Bogart | 65/30 X |
| 3,615,327 | 10/1971 | McLary | 65/30 X |
| 3,549,344 | 12/1970 | Loukes | 65/30 |
| 3,607,172 | 9/1971 | Poole | 65/30 |
| 3,553,063 | 1/1971 | Megles | 65/30 |
| 3,597,179 | 3/1967 | Simmons | 65/30 |
| 3,218,220 | 11/1964 | Weber | 65/30 X |
| 3,323,889 | 6/1967 | Call et al. | 65/30 X |
| 3,468,745 | 9/1969 | Naves et al. | 65/30 X |
| 3,473,906 | 11/1969 | Graham | 65/30 |

*Primary Examiner*—Frank W. Miga
*Attorney*—Conrad Christel and Conrad Christel

[57] ABSTRACT

A combined treatment for newly formed glass bodies for increasing the mechanical strength thereof, and for increasing the scratch resistance of the glass surface. Newly formed glass bodies at elevated temperatures, usually somewhat above 800° F. are sprayed or otherwise coated with stannic chloride, or a compound of titanium or zirconium which pyrolyzes to form a metal oxide film on the glass surface. While still at elevated temperatures the glass bodies are sprayed with an aqueous solution of a potassium compound which volatilizes and deposits potassium salt which acts through the previously deposited tin, titanium or zirconium coating to effect exchange of larger potassium ions for smaller sodium ions in a surface layer of the glass to produce a compressive stress layer. The glass is held at elevated temperature below its strain point, or cooled relatively slowly in a lehr, whereby this ion exchange proceeds to a sufficient degree while the glass is still at elevated temperature. When the glass has cooled it is washed to remove excess unexchanged potassium from the glass surface to expose the tin, titanium or zirconium coating at the exterior of the glass surface, and a final coating of an olefin polymer, such as polyethylene is applied to bond with and coact with the metal oxide coating to substantially improve the scratch resistance of the glass surface. Various transparent organic coatings may be employed in the final coating.

26 Claims, No Drawings

METHOD OF STRENGTHENING GLASS AND INCREASING THE SCRATCH RESISTANCE OF THE SURFACE THEREOF

CROSS REFERENCE TO A RELATED APPLICATION

This invention is a continuation-in-part of our copending application, Ser. No. 782,738, filed Dec. 10, 1968 now abandoned and entitled "Method of Strengthening Glass and Increasing the Scratch Resistance of the Surface Thereof."

BACKGROUND OF THE INVENTION

This invention relates to a method of both strengthening a glass body by chemically effecting exchange of relatively larger ions for smaller ions in a surface layer of the glass to produce a compressive stress layer and for increasing the abrasion resistance of the glass surface by combined metal oxide and olefin polymer coatings.

It is known in the prior art that glass bodies may be strengthened by replacing ions in the glass surface (such as sodium ions) with larger ions such as potassium ions to "pack" the surface and thus produce a compressive stress layer. This general method of strengthening glass is shown in Weber U.S. Pat. No. 3,218,220, dated Nov. 16, 1965.

A refinement of this general method is shown in our prior copending application, Ser. No. 772,835, filed Nov. 1, 1968 now U.S. Pat. No. 3,607,172 issued Sept. 21, 1971, entitled "Tripotassium Phosphate Treatment for Strengthening Glass" wherein the above ion substitution is accomplished by spraying hot glass with an aqueous solution of tripotassium phosphate and holding the glass at an elevated temperature below the strain point thereof for a period of time long enough to effect a substantial exchange of potassium ions for sodium ions, this time period being of the general order of 5 to 30 minutes.

It is also known to increase the abrasion resistance of glass surfaces by applying thereto successive surface coatings of a metal oxide and an olefin polymer or other organic coating. For instance, Carl et al. U.S. Pat. No. 3,323,889, dated June 7, 1967, teaches the increase of resistance to surface abrasion of glass by applying a zirconium-containing compound, or a titanium-containing compound, to a glass surface while the surface is at a high enough temperature to pyrolyze the coating and thus deposit the corresponding metal oxide on the glass surface. The glass is then cooled to a temperature below 450° F. and is sprayed with an olefin polymer such as polyethylene. It appears that the combined metal oxide and olefin polymer coatings produce a glass article which has a vastly superior scratch resistance than that of a glass surface having either coating alone.

An equivalent metal oxide coating may be provided by spraying the glass with a tin compound, for instance, stannic chloride, or by exposing the glass surface to vapors of stannic chloride, the deposited oxides of tin, titanium and zirconium being substantially equivalent in this abrasion-resistance treatment. Other final coatings may be employed instead of the olefin polymer coating disclosed in the above Carl et al patent, as will appear later herein.

As a practical matter, the foregoing prior art chemical strengthening treatment and the prior art abrasion-resistance treatment have been considered to be incompatible and mutually exclusive. Since the potassium spray treatment involves a substantial "soaking" period at relatively elevated temperature, which period can be conveniently combined with the usual annealing period by passage through an annealing lehr, during which the temperature gradually falls to approximately room temperature, and since the excess potassium salt material must be washed from the glass surface before other treatment could be carried on, the application of the combined metal oxide coating and olefin polymer or other coatings subsequent to the potassium ion exchange strengthening treatment is impractical. The metal oxide application must be carried on at temperatures in the general neighborhood of the strain point of the glass and preferably above the strain point. Accordingly, it would be necessary to reheat the glass body after excess potassium salt is washed therefrom in order to carry out the metal oxide application step of the abrasion-resistance treatment. This would be prohibitive economically with respect to such articles as glass containers and the compressive stress resulting from the potassium ion exchange treatment would be largely eliminated by heating the glass above its strain point.

On the other hand, it would be impossible to carry out the abrasion-resistance treatment consisting of the hot end metal oxide coating, cooling of the glass and subsequent olefin polymer or other final coating, all before the potassium ion exchange treatment. This again would require reheating of the glass article to a temperature near the strain point of the glass preparatory to applying the potassium salt coating. In this instance the economic problem of reheating is the least of the trouble since raising the temperature of the glass after the abrasion-resistance treatment to a temperature for receiving the potassium salt spray would burn off the polyethylene or other final coating and thus destroy the effect of the abrasion-resistance treatment. Furthermore, even if the final polyethylene or other coating could resist this degree of heat, the potassium ion exchange treatment could not be carried out through such final coating.

SUMMARY OF THE INVENTION

In the method of the present invention these two desirable treatments, that is, the abrasion-resistance treatment which combines a metal oxide coating and an olefin polymer or other final coating, and a chemical strengthening effected by means of applying a potassium salt spray to the glass at volatilizing temperature, can effectively be combined. We have found that if the hot glass body, for instance, as it comes from the forming machine, is first treated, by spraying or by exposure to vapors, with a metallo-organic compound or a metal halide such as stannic chloride, or a titanium or zirconium oxide, that the glass body, while still at a temperature in the neighborhood of its strain point, may be immediately sprayed with a potassium salt solution and held at the desired elevated temperature for a sufficient period to permit the effective exchange of potassium ions for sodium ions and the consequent ion exchange strengthening of the glass by reason of the compressive stress layer thus induced. We have found, very surprisingly, that the foregoing ion exchange may be effectively carried on and that it acts through the metal oxide coating with substantially the same effect as if the oxide coating were not present.

Accordingly, after the glass is cooled and washed to remove excessive potassium salt, the glass surface with the oxide coating is in substantially the same condition as if the potassium salt treatment had not been applied, that is, insofar as the abrasion-resistance treatment is concerned. Accordingly, the final olefin polymer or equivalent spray treatment may then be applied and this combines with the metal oxide coating in the same manner as in the prior art abrasion-resistance treatments referred to above.

DESCRIPTION OF THE PREFERRED EMBODIMENTS

The following specific examples of method steps and materials suitable for practising the present invention are described, particularly with respect to the use of the invention in connection with the manufacture of glass containers. The exemplary method is performed on glass containers or similar articles as such articles issue from the forming machine, at which time the articles are at a temperature of from 1,200° to 1,400° F. The glass which was treated is conventional soda-lime-silica container glass having a softening point of 1,327° F. an annealing point of 1,022° F. and a strain point of 986° F. The following is the percentage composition of the glass which was treated in accordance with the method of the present invention:

| | |
|---|---|
| $SiO_2$ | 71.5 |
| $Fe_2O_3$ | 0.042 |
| $Al_2O_3$ | 1.25 |
| CaO | 10.25 |
| MgO | 2.5 |
| BaO | 0.035 |
| $Na_2O$ | 13.5 |
| $K_2O$ | 0.023 |
| $SO_3$ | 0.26 |
| $TiO_2$ | 0.014 |

Upon issuance from the forming machine, the glass containers are immediately sprayed with or exposed to vapors of a solution of a titanium-containing or zirconium-containing compound or with stannic or stannous chloride. Any of these materials will immediately pyrolyze at the temperature of the glass issuing from the forming machine, leaving a metal oxide coating. Any other sprayable material which will pyrolyze at the temperature of the glass as it leaves the forming machine and thus deposit a coating of an oxide of tin, titanium or zirconium on the glass surface may be employed.

By way of example, any of the materials set forth in Carl et al. U.S. Pat. No. 3,323,889, dated June 6, 1967 may be employed such as tetrabutyl titanate, tetraisopropyl titanate, tetrakis (2-ethylhexyl) titanate, as well as titanium tetrahalides, such as titanium tetrachloride. The corresponding zirconium compounds may also be employed. Also, the metallo-organic esters set forth in Deyrup U.S. Pat. No. 2,831,780, dated Apr. 22, 1958, may be employed, particularly the alkyl titanates and alkyl zirconates specified therein. Stannic chloride may be sprayed on to the glass using dry air as a spray carrier to deposit a tin oxide coating on the glass with like effect.

Immediately following this metal oxide coating of the glass the surface of the glass is sprayed with an aqueous solution of a potassium salt in the same manner as described in our prior copending application, Ser. No. 772,835, filed Nov. 1, 1968. In that application, tripotassium phosphate is the preferred potassium salt although it is known that dipotassium hydrogen phosphate and potassium carbonate produce potassium ion exchange to a sufficient degree to very materially increase the strength of the glass.

After the potassium salt spray the glass article is held at an elevated temperature, generally for a period of from 5 to 30 minutes, depending upon the strength of the spray solution and the particular potassium salt employed, and also depending upon the temperature of the glass during this "soaking" period. For instance, if the glass is held at a temperature just below its strain point for the full ion exchange period the time required will be less than if the temperature of the glass is permitted to fall from this temperature to a much lower temperature over a period of time, as by passing the glass articles through an annealing lehr. In other words, if the temperature falls gradually from approximately the strain point to a temperature in the neighborhood of 450° F. during the ion exchange period, the period will be longer than if a continuous higher average temperature is provided.

In order to attain compressive stress in a surface layer of a glass body by exchanging layer potassium ions for smaller sodium ions, or by a similar exchange of other larger ions for smaller ions in the glass surface, the ion exchange must take place below the strain point of the glass or the "packing" of the surface layer which produces the compressive stress layer will not take place.

It is therefore desirable that the glass temperature immediately after the potassium salt spray be slightly below the strain point of the glass which, in the present example, is 986° F. The cooling effect of the spray which produces the metal oxide layer, plus the further cooling effect of the aqueous solution of potassium salt will lower the temperature of the glass from the temperature at which it issues from the forming machine to, and preferably slightly below, the strain point of the glass without other treatment although slight intermediate cooling just before or just after the potassium salt spray application may be employed if required. After the glass has passed through the ion exchange period, as for instance by the annealing lehr treatment described in our above-identified copending patent application, and has cooled sufficiently, it is washed to remove excess potassium salt from the surface thereof and, after drying, is ready to receive the final olefin polymer coating which combines with the metal oxide coating to form a thin substantially transparent abrasion-resistant coating on the glass surface.

In other words, after the excess potassium salt is removed from the surface the metal oxide coating comprises the outer surface of the glass article in the identical manner as if the potassium ion exchange step in the treatment had not been performed.

Thus, any of the various olefin polymers described in the aforesaid Carl et al patent may be employed, including polymers of the lower alkenes, such as ethylene, propylene, butylene, and the like. These polymers may be in solution or emulsified in an aqueous medium, as fully described in the Carl et al patent. As a specific example, polyethylene emulsified as described in U.S. Pat. No. 2,995,533 may be employed. A satisfactory composition is as follows, in approximate parts by weight:

| | Parts |
|---|---|
| AC polyethylene No. 629 | 40 |

| | |
|---|---|
| Oleic acid (U.S.P.) | 11 |
| Potassium hydroxide | 2 |
| Distilled water | 207 |

The aforesaid polyethylene is distributed by Allied Chemical and Dye Corporation. The above emulsion is then diluted with up to about 200 parts water by volume and sprayed directly onto the glass surface. After this coating is dry the combined chemical strengthening and abrasion-resistance treatment of the present invention is complete.

Since the metal oxide coating is conventionally applied to glass articles at relatively high temperatures as the articles are discharged from the forming machines and the polymer or equivalent coating is applied after the article has cooled, generally as the article exits from the annealing lehr, the metal oxide coatings are conventionally known as "hot end coatings" and the polymer or similar final coatings are generally known as "cold end coatings."

It is well known in the art that a number of equivalent organic cold end coatings may be used with either of the hot end coatings mentioned above in place of the olefin polymer coating disclosed in the Carl et al. patent identified above.

Among the prior art patents disclosing cold end coatings are the foowing:

Lagally U.S. Pat. No. 3,108,920, dated Oct. 29, 1963, discloses a polymer of vinyl alkoxy silane.

Dettre U.S. Pat. No. 3,161,534, dated Dec. 15, 1964, discloses either aqueous or alcohol solutions of sodium oleate and solutions of other oleic acids in cetane, referring particularly to a tin hot end coating.

Pickard U.S. Pat. No. 3,352,707, dated Nov. 14, 1967, discloses a water-insoluble polyvinyl alchohol coating over a tin hot end coating.

Pickard U.S. Pat. No. 3,357,853, dated Dec. 12, 1967, discloses a mixture of polyvinyl alcohol, emulsified polyolefin and an inorganic acid, without specifying the nature of the hot end coating.

Bruss U.S. Pat. No. 3,414,429, dated Dec. 3, 1968, discloses a cold end coating comprising an emulsion containing salts of higher fatty alcohol sulfates, giving sodium stearyl sulfate and sodium celyl sulfate as examples. This patent specifies either tin or titanium coatings.

Scholes U.S. Pat. No, 3,420,693, dated Jan. 7, 1969, discloses polyethylene and various organic soaps and mixtures thereof as a cold end coating over a tin hot end coating.

All of the known prior art cold end coatings have beem employed in practising the method of the present invention with various hot end coatings and are found to be useful and workable.

In addition to the procedural advantages of combining the ion exchange strengthening and the abrasion resistance treatments as described above, the combined treatments attain a very important objective in providing a degree of strengthening which, due to the combined abrasion resistance treatment, is of much greater significance than if the abrasion resistance treatment were not combined therewith.

In strengthening glass by providing a compressive stress layer, whether this be by ion exchange or by conventional thermal tempering, account must be taken of the fact that the actual degree of strengthening is measured by the least thickness of the compressive stress layer. Accordingly, the thickness of the compressive stress layer must be considered to be diminished by the depth of whatever scratches may occur in the surface. For this reason it is conventional to consider that a compressive stress depth of from 20 to 30 microns is required to make due allowance for the reduction of this effecive depth by scratches or abrasion.

With the present method, due to the fact that abrasion resistance treatment directly accompanies the strengthening of the glass by providing a compressive stress layer, the depth of the compressive stress layer may be much less than in conventional tempering treatments or ion exchange strengthening treatments.

A thin compressive stress layer of, for instance, 5 microns, which would be of little value since the layer would be substantially penetrated by scratches and abrasions, would afford a significant strength increase in glass treated as provided herein since it is protected from surface damage by the combined abrasion resistance treatment.

We claim:

1. A method of increasing the strength and abrasion-resistance of soda-lime glass which comprises treating the surface of the glass with a compound containing a metal of the group consisting of tin, titanium and zirconium, which compound is pyrolyzable to form the respective metal oxide on the glass surface while the surface is at a temperature at least as high as the pyrolyzing temperature of the compound, then spraying said surface with an aqueous solution of a potassium salt to form a continuous coating layer thereon while said glass is still at an elevated temperature in the approximate area of the strain point temperature of the glass, maintaining said glass at an elevated temperature below the strain point of the glass for a sufficient period of time to provide for a substantial exchange of potassium ions for sodium ions of the glass to a depth sufficient to produce a substantial compressive stress layer but not for a sufficient time to produce stress relaxation, cooling the glass, then washing the same to remove excess potassium salt from the glass surface, and then spraying onto the glass surface an olefin polymer in an amount sufficient to form an adherent transparent coating on said surface.

2. The method of claim 1 wherein said potassium salt comprises tripotassium phosphate.

3. The method of claim 1 wherein said potassium salt comprises dipotassium hydrogen phosphate.

4. The method of claim 1 wherein said potassium salt comprises potassium carbonate.

5. The method of claim 1 wherein said metal containing compound comprises stannic chloride.

6. The method of claim 1 wherein said metal containing compound comprises alkyl titanate.

7. The method of claim 1 wherein said metal containing compound comprises a pyrolyzable zirconium compound.

8. The method of claim 1 wherein said metal containing compound comprises a metallo-organic ester selected from the group consisting of alkyl titanates and alkyl zirconates.

9. The method of claim 1 wherein said olefin polymer comprises polyethylene.

10. The method of claim 5 wherein said olefin polymer comprises polyethylene.

11. The method of claim 6 wherein said olefin polymer comprises polyethylene.

12. The method of claim 7 wherein said olefin polymer comprises polyethylene.

13. The method of claim 5 wherein said potassium salt comprises tripotassium phosphate.

14. The method of claim 6 wherein said potassium salt comprises tripotassium phosphate.

15. The method of claim 7 wherein said potassium salt comprises tripotassium phosphate.

16. A method of increasing the strength and abrasion-resistance of soda-lime glass which comprises treating the surface of the glass with a compound containing a metal of the group consisting of tin, titanium and zirconium, which compound is pyrolyzable to form the respective metal oxide on the glass surface while the surface is at a temperature at least as high as the pyrolyzing temperature of the compound, then spraying said surface with an aqueous solution of a potassium salt to form a continuous coating layer thereon while said glass is still at an elevated temperature in the approximate area of the strain point temperature of the glass, maintaining said glass at an elevated temperature below the strain point of the glass for a sufficient period of time to provide for a substantial exchange of potassium ions for sodium ions of the glass to a depth sufficient to produce a substantial compressive stress layer but not for a sufficient time to produce stress relaxation, cooling the glass, then washing the same to remove excess potassium salt from the glass surface, and then spraying onto the glass surface a material selected from the group consisting of olefin polymers, vinyl polymers and stearates, and mixtures thereof, to form a tightly adherent, thin, transparent, substantially colorless coating on said surface.

17. The method of claim 16 wherein said potassium salt comprises tripotassium phosphate.

18. The method of claim 16 wherein said potassium salt comprises dipotassium hydrogen phosphate.

19. The method of claim 16 wherein said potassium salt comprises potassium carbonate.

20. The method of claim 16 wherein said metal containing compound comprises stannic chloride.

21. The method of claim 16 wherein said metal containing compound comprises alkyl titanate.

22. The method of claim 16 wherein said metal containing compound comprises a pyrolyzable zirconium compound.

23. The method of claim 16 wherein said metal containing compound comprises a metallo-organic ester selected from the group consisting of alkyl titanates and alkyl zirconates.

24. The method of claim 20 wherein said potassium salt comprises tripotassium phosphate.

25. The method of claim 21 wherein said potassium salt comprises tripotassium phosphate.

26. The method of claim 22 wherein said potassium salt comprises tripotassium phosphate.

* * * * *